(12) United States Patent
Higuchi et al.

(10) Patent No.: US 6,312,263 B1
(45) Date of Patent: Nov. 6, 2001

(54) BOARD-TO-BOARD CONNECTOR CAPABLE OF READILY ELECTRICALLY CONNECTING TWO PARALLEL BOARDS TO EACH OTHER

(75) Inventors: Masao Higuchi, Akishima; Masakazu Matsuda, Kawasaki; Yoshiaki Ishiyama, Ebina; Kazuaki Ibaraki, Higashimurayama; Hiroki Abe, Kitamurayama-gun, all of (JP)

(73) Assignee: Japan Aviation Electronics Industries, Ltd., Tokyo (JP)

( * ) Notice: Subject to any disclaimer, the term of this patent is extended or adjusted under 35 U.S.C. 154(b) by 0 days.

(21) Appl. No.: 09/629,014

(22) Filed: Jul. 31, 2000

(30) Foreign Application Priority Data

Aug. 4, 1999 (JP) .................................... 11-221405
Sep. 30, 1999 (JP) .................................... 11-278390

(51) Int. Cl.[7] .................................................. H01R 09/09
(52) U.S. Cl. ................................................................ 439/66
(58) Field of Search ................................. 439/66, 67, 74, 439/71, 326, 65; 349/149, 150, 152

(56) References Cited

U.S. PATENT DOCUMENTS

| | | | |
|---|---|---|---|
| 3,598,960 | * 8/1971 | Deacon | 219/345 |
| 4,350,403 | 9/1982 | Seytre et al. . | |
| 4,530,554 | 7/1985 | Velsher et al. . | |
| 4,738,625 | 4/1988 | Burton et al. . | |
| 4,769,908 | * 9/1988 | Olsson | 29/884 |
| 4,936,784 | 6/1990 | Saito . | |
| 5,747,877 | * 5/1998 | Wilson | 257/703 |
| 5,888,076 | 3/1999 | Itoh et al. . | |
| 6,077,095 | * 6/2000 | DelPrete et al. | 439/92 |
| 6,089,876 | * 7/2000 | Kuwahara et al. | 439/67 |
| 6,091,474 | * 7/2000 | Middleton et al. | 349/149 |
| 6,151,219 | * 11/2000 | Dye | 361/737 |

* cited by examiner

Primary Examiner—Gary Paumen
Assistant Examiner—Phuong Nguyen
(74) Attorney, Agent, or Firm—Michael Best & Friedrich LLC; J. Warren Whitesel

(57) ABSTRACT

In a connector having a plurality of conductive contacts assembled to an insulator, each of the contacts has unique structure for electrically connecting a first and a second board to each other. The first board has a primary surface and a secondary surface opposed to each other. The second board has a principal surface facing the secondary surface with a space left therebetween. In the unique structure, a base portion is placed in the space and held by the insulator. A first elastic portion extends from the base portion to face a primary surface. A first contact portion is protruded from the first elastic portion to come in contact with one of electrode patterns arranged on the primary surface. A second elastic portion extends from the base portion. A second contact portion is protruded from the second elastic portion to come in contact with one of electrode patterns arranged on the principal surface.

8 Claims, 9 Drawing Sheets

FIG. 1
(PREVIOUS TECHNIQUE)

FIG. 2
(PREVIOUS TECHNIQUE)

BOARD-TO-BOARD CONNECTOR CAPABLE OF READILY ELECTRICALLY CONNECTING TWO PARALLEL BOARDS TO EACH OTHER

BACKGROUND OF THE INVENTION

This invention relates to a board-to-board connector which is usable in a small electronic apparatus such as a mobile telephone, a mobile terminal, and a digital still camera.

In the manner known in the art, such a small electronic apparatus comprises an LCD board and a main board which are electrically connected to each other. For connecting the LCD board and the main board to each other, proposal has been made as follows.

Figure 1:
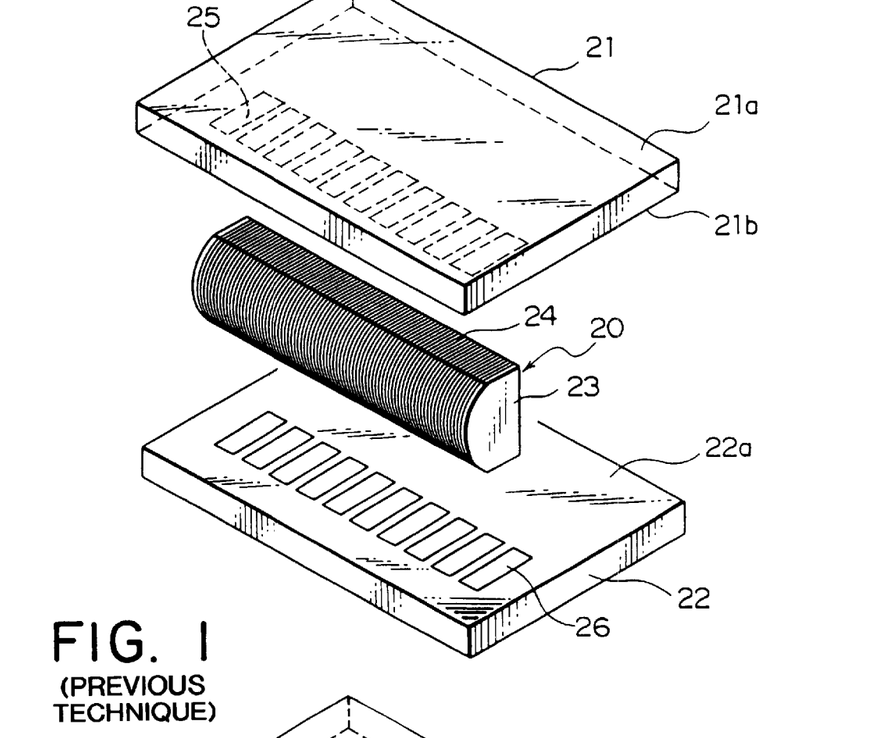
FIG. 1 is a perspective view showing a board-to-board connector in a previous technique together with two boards before connection.

Referring to FIG. 1, a board-to-board connector comprises an elastomer connector 20 for electrically connecting a first or LCD board 21 and a second or main board 22 to each other. The connector 20 comprises an insulator 23 having elasticity and a number of contacts 24 fixed on the surface of the insulator 23 at a predetermined interval. The insulator 23 is formed into a shape such that a part of a cylinder is coupled with a rectangular parallelepiped body. The first board 21 has a primary surface 21a and a secondary surface 21b opposed to the primary surface 21a. Electrode patterns 25 are arranged on the primary surface 21b at the predetermined interval. The second board 22 has a principal surface 22a on which electrode patterns 26 are arranged at the predetermined interval.

Figure 2:
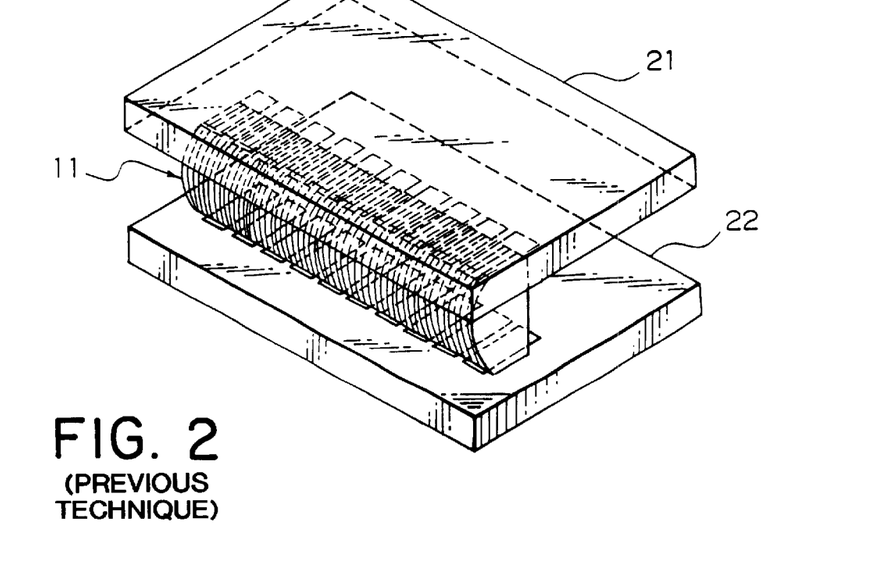
FIG. 2 is a perspective view of the board-to-board connector of FIG. 1 together with the boards after connection.

Referring to FIG. 2, the connector 20 is interposed between the first and the second boards 21 and 22 that are parallel to each other. In other words, the first board 21 is placed on an upper surface of the connector 20 while the second board 22 is placed on a lower surface of the connector 20 with a space left between the first and the second boards 21 and 22. In this state, the electrode patterns 25 and 26 are in contact with the contacts 24, respectively. Therefore, the electrode patterns 25 of the first board 21 are electrically connected to the electrode patterns 26 of the second board 22 through the contacts 24 of the connector 11.

However, the connector 20 is weak in contacting force per one terminal and unstable in contact resistance. Since silicone rubber is used as a material of the insulator, the profile deformation is great. It is therefore impossible to improve a positional accuracy. In addition, short-circuiting between the electrode patterns on the LCD board and short-circuiting between the electrode patterns on the main board are often caused to occur. Furthermore, durability is poor.

SUMMARY OF THE INVENTION

It is therefore an object of the present invention to provide a board-to-board connector which can considerably reduce the number of manufacturing steps of an LCD board and the production cost.

It is another object of the present invention to provide a board-to-board connector of the type described, which does not require an FPC and a solder to connect the LCD board and a main board.

It is still another object of the present invention to provide a board-to-board connector of the type described, which is substantially free from short-circuiting between electrode patterns on each of the boards.

It is yet another object of the present invention to provide a board-to-board connector of the type described, which has a durability and a reworkability.

It is a further object of the present invention to provide a board-to-board connector of the type described, which is compact.

According to the present invention, there is provided a board-to-board connector for electrically connecting a first and a second board to each other, the first board having a primary surface and a secondary surface opposed to the primary surface in a first direction, the second board having a principal surface facing the secondary surface with a space left therebetween in the first direction, the first board having a plurality of first electrode patterns arranged on the primary surface, the second board having a plurality of second electrode patterns arranged on the principal surface. The board-to-board connector comprises an insulator and a plurality of conductive contacts assembled to the insulator. Each of the conductive contacts comprises a base portion placed in the space and held by the insulator, a first elastic portion extending from the base portion to face the primary surface, a first contact portion protruded from the first elastic portion towards the primary surface for coming in contact with one of the first electrode patterns, a second elastic portion extending from the base portion between the base portion and the principal surface, and a second contact portion protruded from the second elastic portion towards the principal surface for coming in contact with one of the second electrode patterns.

DESCRIPTION OF THE PREFERRED EMBODIMENTS

With reference to FIGS. 3 through 7, description will be made about a board-to-board connector according to a first embodiment of this invention. Similar parts are designated by like reference numerals.

The board-to-board connector is for electrically connecting the first or LCD board 21 to the second or main board 22. The first board 21 is of a rectangular-shape. The second board 22 is of a generally rectangular-shape. In the manner which will later be described, the first and the second boards 21 and 22 faces to each other with a space S left therebetween in the first direction A1.

The board-to-board connector comprises an insulator 31 placed in the space S and a plurality of conductive contacts 32 assembled to the insulator 31 and arranged at a predetermined interval in a second direction A2 perpendicular to the first direction A1. Each of the contacts 32 is formed to have a U-shaped portion 33 and a hairpin-shaped portion 34 which are coupled to each other.

Figure 5:
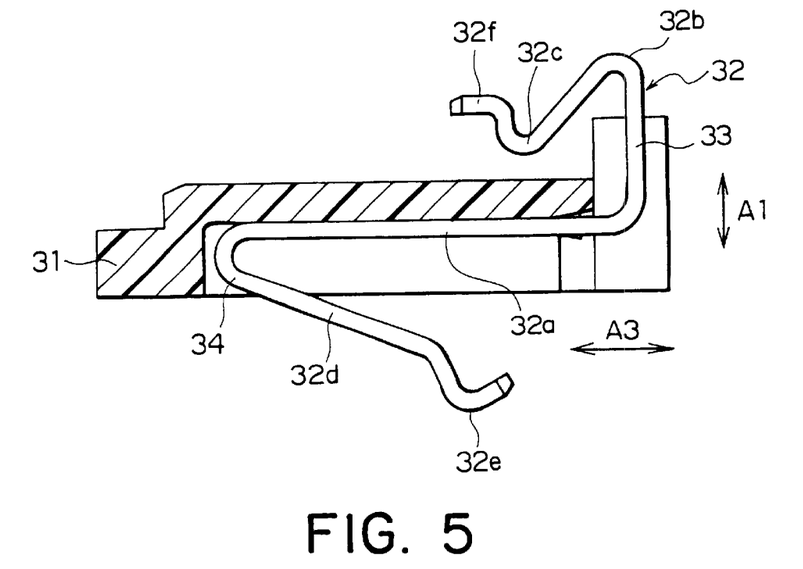
FIG. 5 is a sectional view taken along a line V—V in FIG. 4B.
Figure 6:
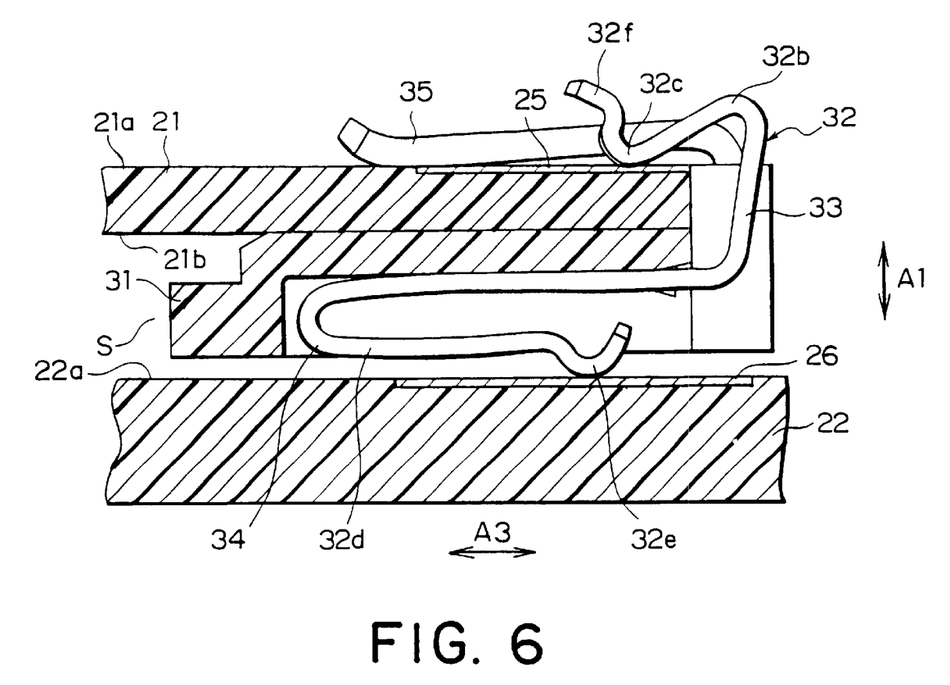
FIG. 6 is a sectional view similar to FIG. 5, wherein the board-to-board connector connects two boards to each other.

More particularly, each of the contacts 32 comprises a base portion 32a, a fist elastic portion 32b, a first contact portion 32c, a second elastic portion 32d, and a second contact portion 32e. The base portion 32a is placed in the space S and held by the insulator 31 and extends in a third direction A3 perpendicular to the first and the second directions A2 and A3. The first elastic portion 32b extends from the base portion 32a to face the primary surface 21a of the first board 21. The first contact portion 32c is protruded from the first elastic portion 32b towards the primary surface 21a for coming in contact with one of the first electrode patterns 25 by elastic force of the first elastic portion 32b. The second elastic portion 32d extends from the base portion 32a between the base portion 32a and the principal surface 22a of the second board 22. The second contact portion 32e protrudes from the second elastic portion 32d towards the principal surface 22a of the second board 22 for coming in contact with one of the second electrode patterns 26 by elastic force of the second elastic portion 32d.

Thus, the first and the second boards 21 and 22 are reliably connected to each other. Since the first contact portion 32c is brought into contact with the electrode pattern 26 on the second board 22 by the elastic force of the first elastic portion 32b, the connector can easily be released from the first board 21. Even if the distance or the space S between the first and the second board 21 and 22 is varied as a result of the change in temperature or the like, the connector is adaptable to such variation since the contact 32 has the elastic force.

Figure 7:
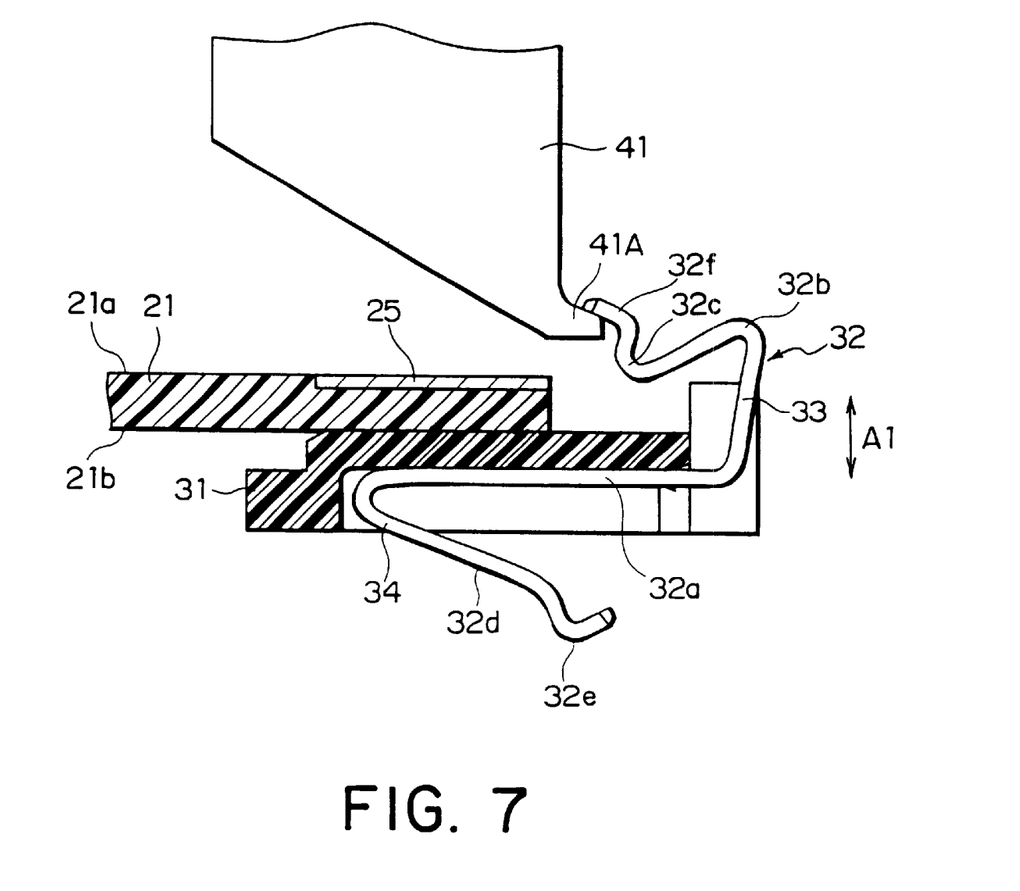
FIG. 7 is a sectional view similar to FIG. 5, wherein a connector inserting jig is used for inserting a board into the board-to-board connector.

Each of the contacts 32 further comprises an engaging portion 32f connected to the first contact portion 32c. The engaging portion 32f has a shape adapted for engaging with a connector inserting jig 41 in the first direction A1. More particularly, the engaging portion 32f is of a sickle-shape and is formed at an end of the first contact portion 32c of each contact 32.

Before the first board 21 is inserted into the U-shaped portion 33, a projecting portion 41a of the connector inserting jig 41 is engaged with the engaging portion 32f to widen the U-shaped portion 33 as shown in FIG. 7. Thus, the first board 21 is readily attached to the insulator 31. In addition, the electrode pattern 25 on the first board 21 is hardly damaged by the first contact portion 32c in each contact 32.

Figure 3A:
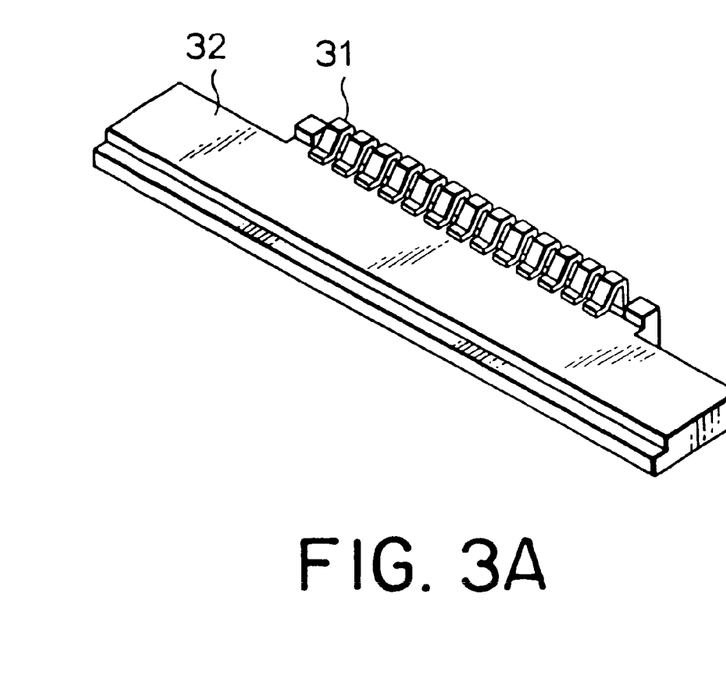
FIG. 3A is a front, top, and right side perspective view of a board-to-board connector according to a first embodiment of this invention.
Figure 3B:
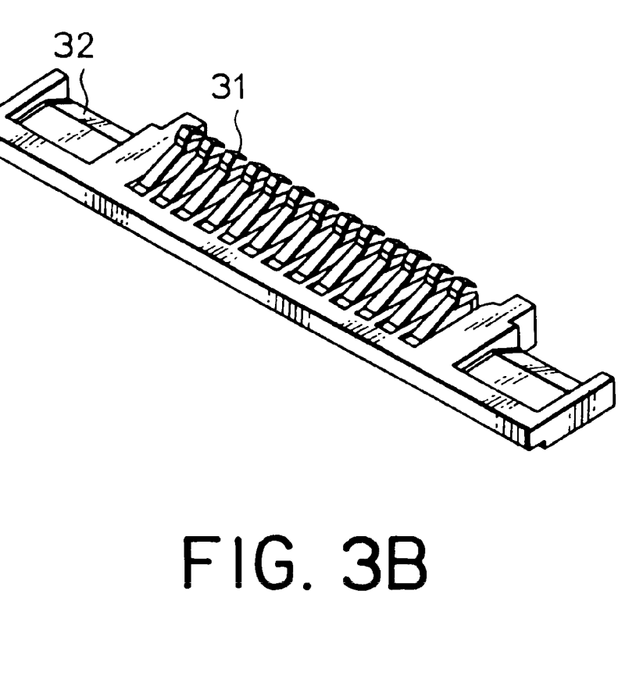
FIG. 3B is a front, bottom, and right side perspective view of the board-to-board connector of FIG. 3A.
Figure 4A:
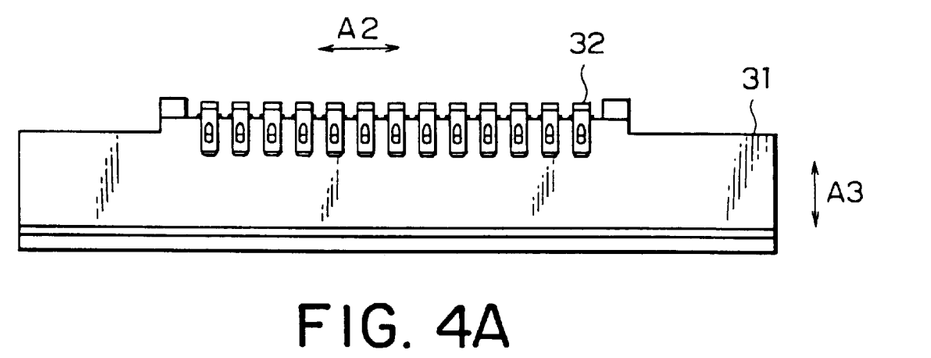
FIG. 4A is a top view of the board-to-board connector of FIGS. 3A and 3B.
Figure 4B:
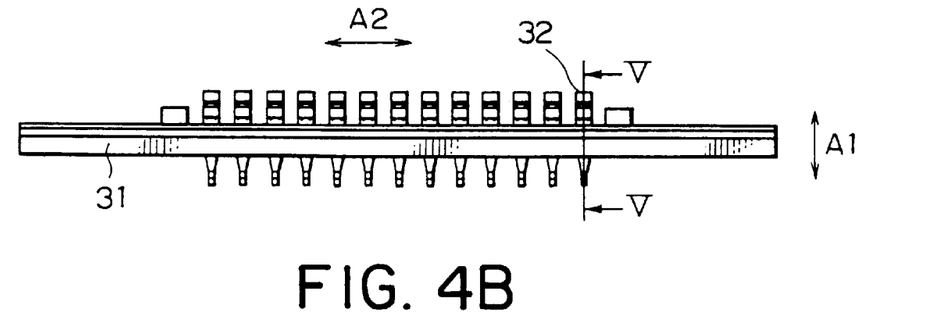
FIG. 4B is a front view of the board-to-board connector of FIG. 4A.

The board-to-board connector further comprises a pair of clips 35 for clipping the first board 21 and the insulator 31 in the first direction A1 to fix the insulator 31 to the first board 21. It is preferable that an insulation coating such as polyimide is provided at a part of each clip 35 to be brought into contact with the electrode patterns 25 on the first board 21. In this event, it is possible to prevent short-circuiting of the electrode patterns 25 on the first board 21 via the clips 35.

Figures 8A, 8B, 8C:
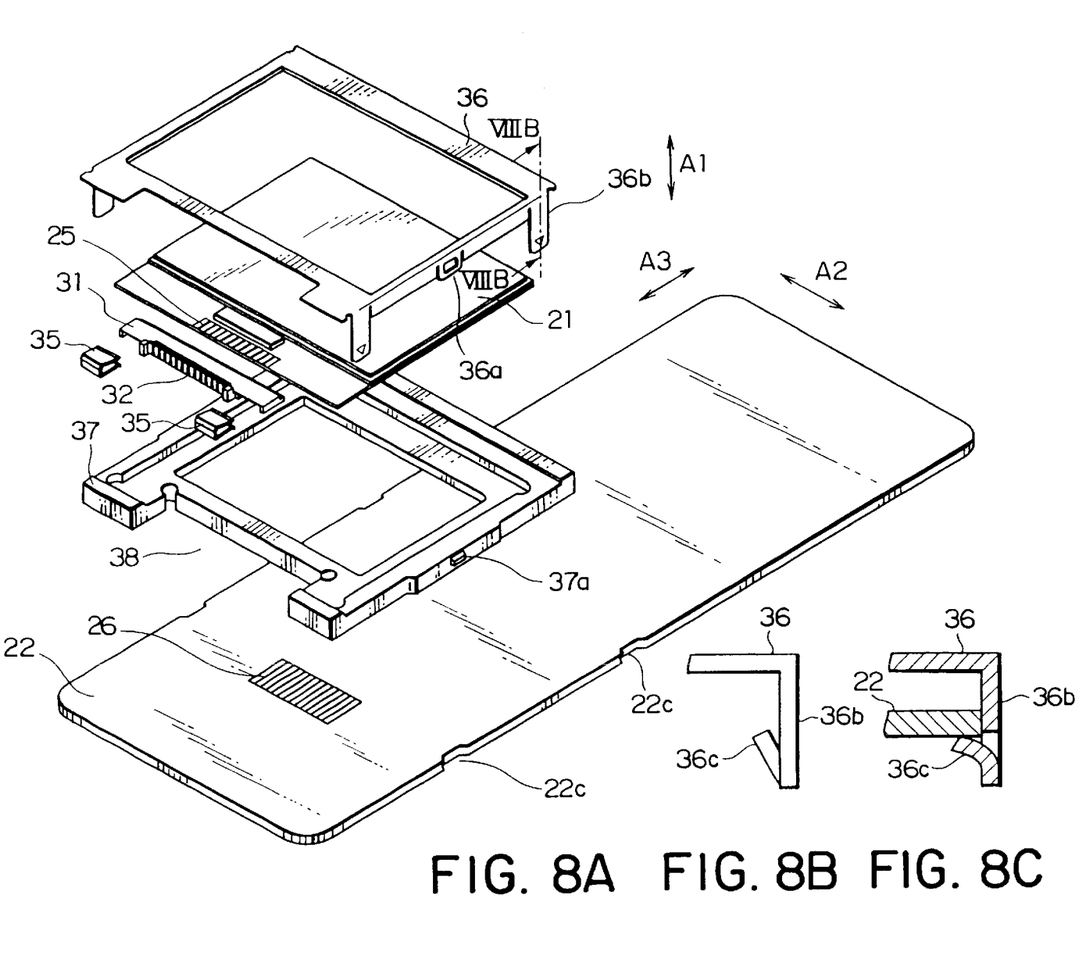
FIG. 8A is an unassembled perspective view of connection structure for electrically connecting two boards to each other by the use of the board-to-board connector illustrated in FIGS. 3A, 3B, 4A, and 4B.
FIG. 8B is an enlarged sectional view taken along a line VIIIB—VIIIB in FIG. 8A.
FIG. 8C is an enlarged sectional view similar to FIG. 8B, wherein one of boards is engaged with a hook of a fixing member.
Figure 9:
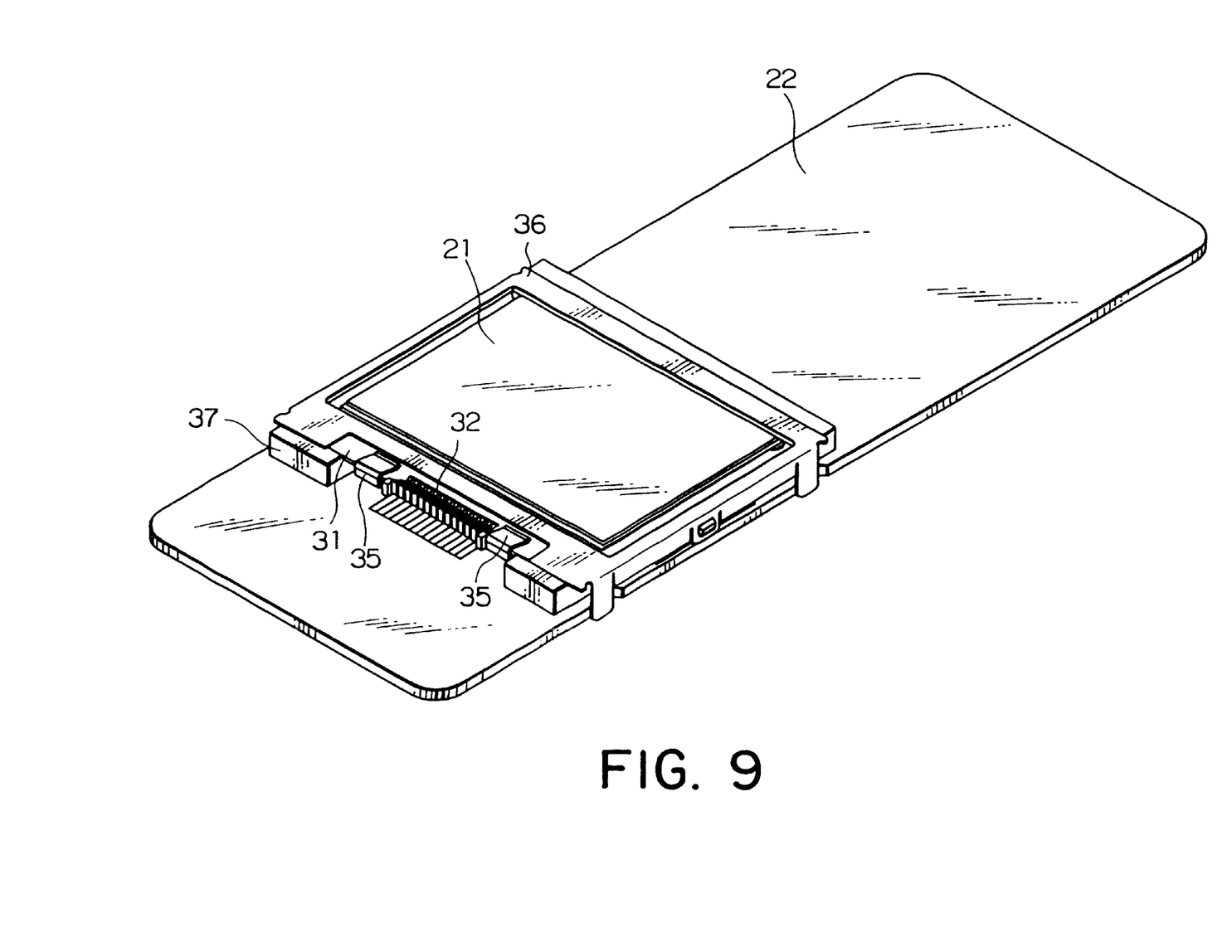
FIG. 9 is an assembled perspective view of the connection structure of FIG. 8A.

Referring to FIGS. 8A through 9, the description will be directed connection structure using the board-to-board connector.

In order to connect the first and the second boards 21 and 22 by the board-to-board connector, use is made of a fixing member 36 and a frame 37. The fixing member 36 is of a generally rectangular-shape and has a hole 36a formed at the center of each of the both side surfaces thereof and an engaging portions 36b formed at the four corners thereof for engaging with the frame 37 in the first direction A1. The frame 37 is of a generally rectangular-shape and has a projection 37a formed at the center of each of the both side surfaces thereof.

The board-to-board connector is at first fixed to the first board 21 by the clips 35. Next, the first board 21 is mounted on the frame 37 made of synthetic resin. In this event, the board-to-board connector is located in a recess 38 at a front side of the frame 37. Subsequently, the frame 37 is placed on the first board 22. As a result, the first board 21, the frame 37, and the second board 22 are stacked. In this state, the frame 37 is interposed between the first and the second boards 21 and 22 to form the space S therebetween.

Furthermore, the fixing member 36 is mounted on the first board 21. In this event, the hole 36a of the fixing member 36 is fitted to the projection 37a of the frame 37. The hole 36a has a hole defining edge which will be referred to as a second engaging part.

Moreover, the engaging portions 36b of the fixing member 36 are inserted into recesses 22c formed at two positions of the both sides of the second board 22. In this state, a hook 36c formed on each engaging portion 36b is engaged with the lower surface of the second board 22 by the elasticity, as illustrated in FIG. 8C. The hook 36c will be referred to as a first engaging part.

Finally, the state illustrated in FIG. 9 is obtained. Specifically, the first contact portion 32c of each contact 32 is brought into contact with the electrode pattern 25 on the first board 21 while the second contact portion 32e of each contact 32 is brought into contact with the electrode pattern 26 on the second board 22. Thus, the first and the second boards 21 and 22 are connected to each other through the board-to-board connector.

Figure 10:
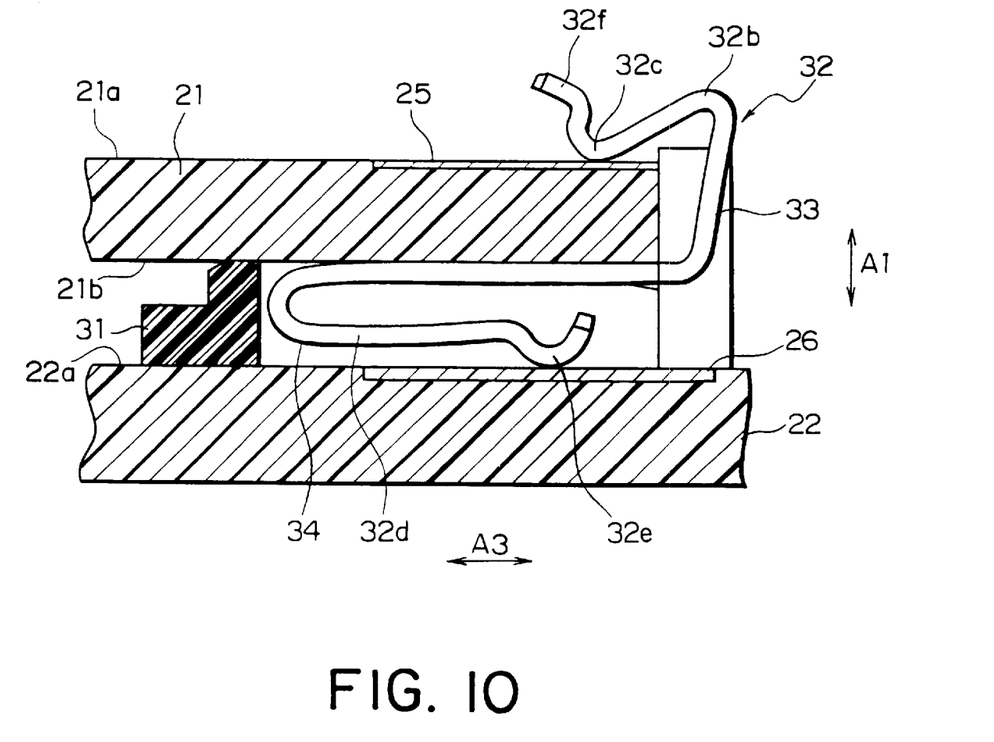
FIG. 10 is a sectional view of the board-to-board connector according to a second embodiment of this invention, wherein the board-to-board connector connects two boards to each other.

With reference to FIG. 10, the description will be made as regards a board-to-board connector according to a second embodiment of this invention. Similar parts are designated by like reference.

In the board-to-board connector, the insulator 31, the hairpin-shaped portion 34, a lower part of the U-shaped portion 33, and the second contact portion 32e are arranged between the first and the second boards 21 and 22. The first board 21 is supported by the insulator 31 and the lower part of the U-shaped portion 33. However, it is possible to modify the design so that the first board 21 is supported only by either one of them.

Figure 11:
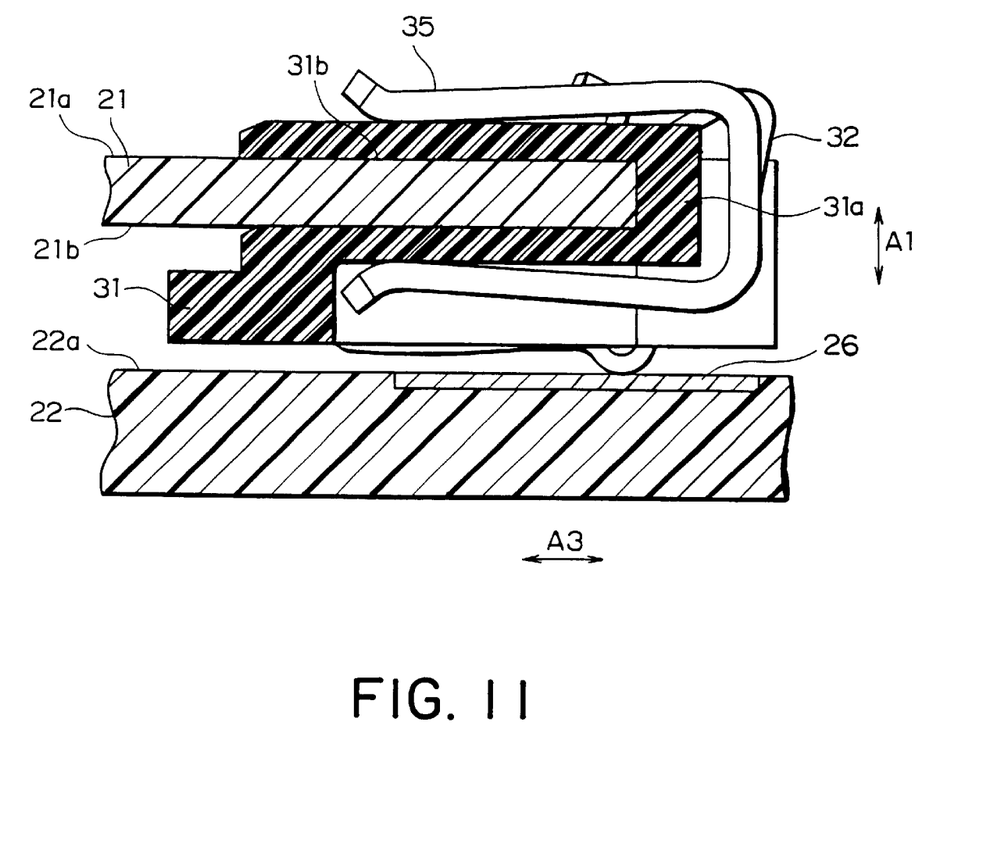
FIG. 11 is a sectional view of the board-to-board connector according to a third embodiment of this invention, wherein the board-to-board connector connects two boards to each other.

With reference to FIG. 11, the description will be made as regards a board-to-board connector according to a third embodiment of this invention. Similar parts are designated by like reference.

In the board-to-board connector, the insulator 31 has a U-shaped portion 31a which is elastically deformable in the first direction A1. The first board 21 is inserted into a groove 31b of the U-shaped portion 31a. In other words, the U-shaped portion 31a is fitted over an end portion of the first board 21. In addition, the U-shaped portion 31a is clipped or pinched by the clips 35. Thus, the first board 21 is held by the insulator 31.

What is claimed is:

1. A board-to-board connector for electrically connecting a first and a second board to each other, said first board having a primary surface and a secondary surface opposed to said primary surface in a first direction, said second board having a principal surface facing said secondary surface with a space left there between in said first direction, said first board having a plurality of first electrode patterns arranged on said primary surface, said second board having a plurality of second electrode patterns arranged on said principal surface, said board-to-board connector comprising an insulator and a plurality of conductive contacts assembled to said insulator, each of said conductive contacts comprising:

a base portion placed in said space and held by said insulator, said base portion extending parallel to said first board;

a first elastic portion extending from said base portion to face said primary surface, said first elastic portion cooperating with said base portion to make a U-shaped portion there between:

a first contact portion protruding from said first elastic portion towards said primary surface for coming in contact with one of said first electrode patterns by an elastic force of said U-shaped portion;

a second elastic portion extending from said base portion between said base portion and said principal surface, said second elastic portion cooperating with said base portion to make a hairpin-shaped portion there between; and a second contact portion protruded from said second elastic portion towards said principal surface for coming in contact with one of said second electrode patterns by an elastic force of said hairpin-shaped portion.

2. A board-to-board connector as claimed in claim 1, wherein each of said conductive contacts has an engaging portion connected to said first contact portion, said engaging portion having a shape adapted for engaging with a connector inserting jig in said first direction.

3. A board-to-board connector as claimed in claim 1, wherein said insulator has a U-shaped portion fitted over an end portion of said first board, said U-shaped portion of the insulator being elastically deformable in said first direction, said board-to-board connector further comprising a clip for clipping said U-shaped portion of the insulator in said first direction to fix said insulator to said first board.

4. A board-to-board connector as claimed as claim 1, wherein said conductive contacts are arranged in a second direction perpendicular to said first direction, said base portion extending in a third direction perpendicular to said first and said second directions.

5. A board-to-board connector as claimed in claim 1, wherein said insulator is placed in said space, said board-to-board connector further comprising a clip for clipping said first board and said insulator in said first direction to fix said insulator to said first board.

6. A board-to-board connector as claimed in claim 5, wherein said clip is insulated from said first board.

7. A board-to-board connector as claimed in claim 1, further comprising a frame interposed between said first and said second boards to form said space and a fixing member superposed on said first board and having a first engaging part for engaging with said second board in said first direction.

8. A board-to-board connector as claimed as claim 6, wherein said fixing member further has a second engaging part for engaging with said frame in said first direction.

* * * * *

UNITED STATES PATENT AND TRADEMARK OFFICE
CERTIFICATE OF CORRECTION

PATENT NO.    : 6,312,263 B1
DATED         : November 6, 2001
INVENTOR(S)   : Masao Higuchi et al.

It is certified that error appears in the above-identified patent and that said Letters Patent is hereby corrected as shown below:

Column 3,
Line 17, delete "faces" and insert -- face --;
Line 32, delete "A2 and A3" and insert -- A1 and A2 --;
Line 64, delete "41a" and insert -- 41A --;

Column 4,
Line 29, delete "first board 22" and insert -- first board 21 --;

Signed and Sealed this

Twenty-fourth Day of September, 2002

Attest:

Attesting Officer

JAMES E. ROGAN
Director of the United States Patent and Trademark Office